United States Patent [19]

Diehl et al.

[11] Patent Number: 5,008,692
[45] Date of Patent: Apr. 16, 1991

[54] FILM METERING APPARATUS AND METHOD WITH DRIVE SPEED REDUCTION

[75] Inventors: Conrad Diehl, Rochester; David C. Smart, Fairport; Wayne E. Stiehler, Spencerport, all of N.Y.

[73] Assignee: Eastman Kodak Company, Rochester, N.Y.

[21] Appl. No.: 486,488

[22] Filed: Feb. 28, 1990

[51] Int. Cl.⁵ .............................................. G03B 1/12
[52] U.S. Cl. ............................... 354/173.1; 354/213
[58] Field of Search ........................... 354/173.1, 213

[56] References Cited

U.S. PATENT DOCUMENTS

| | | |
|---|---|---|
| 655,075 | 7/1900 | Hales . |
| 1,195,187 | 8/1916 | Cuthbert . |
| 1,235,320 | 7/1917 | Ide . |
| 1,984,143 | 12/1934 | Kraft .................................. 88/18.4 |
| 3,677,159 | 7/1972 | Studley .................................. 95/31 |
| 3,709,128 | 1/1973 | Beach .................................. 95/31 |
| 3,712,200 | 1/1973 | Beach .................................. 95/31 |
| 3,724,348 | 4/1973 | Monks .................................. 95/31 |
| 4,141,635 | 2/1979 | Asano et al. .......................... 354/173 |
| 4,175,845 | 11/1979 | Iwashita et al. ..................... 354/173 |
| 4,304,480 | 12/1981 | Fukahori et al. .................... 354/173 |
| 4,431,292 | 2/1984 | Takahashi ....................... 354/173.11 |
| 4,474,442 | 10/1984 | Shiozawa et al. .............. 354/173.11 |
| 4,482,227 | 11/1984 | Shiozawa et al. .............. 354/173.11 |
| 4,576,457 | 3/1986 | Fukuda et al. ................. 354/173.11 |
| 4,639,111 | 1/1987 | Harvey ............................... 354/481 |
| 4,697,899 | 10/1987 | Kawamura et al. ........... 354/173.11 |
| 4,734,732 | 3/1988 | Nishio et al. .................. 354/173.11 |

*Primary Examiner*—Michael L. Gellner
*Attorney, Agent, or Firm*—Roger A. Fields

[57] ABSTRACT

A film metering mechanism has parallel pawl and blade elements with apertures that align in the beam of an infrared detector to slow down a camera drive motor when a pawl tooth senses a perforation during film advance, prior to reaching a drive motor stopping point. The pawl has a cutout with upper longitudinal and ramp surfaces that engage a fixed pin. The blade has a stepped surface that shifts contact between two pawl pins in correspondence with the relative location of the cutout surfaces and the fixed pin.

18 Claims, 2 Drawing Sheets

FILM METERING APPARATUS AND METHOD WITH DRIVE SPEED REDUCTION

The present invention relates generally to film frame metering and registration in a still film camera; and, more particularly, to an improved mechanical pawl film metering system suitable for use with motorized film advance drives, and including means for initiating drive speed reduction during frame advancement.

BACKGROUND OF THE INVENTION

In a still camera, the importance of achieving accurate metering and registration of each image frame with the exposure gate in the frame-to-frame advance between exposures of a filmstrip has long been recognized. Proper frame alignment with the picture-taking optical axis not only ensures correct frame-to-frame spacing and avoidance of overlap in a series of exposed images, but also positions the film frame for properly locating exposure data and the like relating to a specific frame and recorded adjacent thereto on the film at the time of exposure for later reference in producing prints. Harvey U.S. Pat. No. 4,639,111, for example, discloses marginal encoding by optical means adjacent a frame at the time of exposure of frame specific field of view identification information in a tele/pan camera.

Cameras incorporating drive mechanisms for the frame-to-frame film transport between supply and take-up reels have means for stopping the advance of film along a camera exposure plane, at a position of registration of the next available frame in optical alignment with a picture-taking optical axis. A common practice of achieving accuracy of metering and registration is to utilize film resident, frame correlated marginal fiducials in the form of single perforations per frame, which can be detected to determine the correct positioning for the next frame.

A well-known conventional system, uses a single perforation per frame film and a mechanical claw or pawl that detects the perforation corresponding to the next frame and establishes registration of that frame when that perforation reaches a desired stopping point. Examples of such film metering devices are shown in Beach U.S. Pat. Nos. 3,709,128 and 3,712,200; and Monks U.S. Pat. No. 3,724,348, the disclosures of which are incorporated herein.

Once registration is achieved, it is desirable to provide means to maintain such registration until commencement of the next exposure. In the absence of such provision, the film is subject to creep out of alignment due to vibration or physical shock forces exerted on the camera body or residual torque forces exerted by the drive mechanism. For cameras designed to operate with a single perforation per frame film, such as 110 and 126 format cameras, registration is typically maintained by engaging the pawl at a stopping point through the perforation and into a slot located in the camera wall or film cartridge, until the next exposure. The metering mechanism is usually mechanically coupled with the shutter release mechanism, to release the pawl from its registration engagement by a separate mechanical member which moves in response to taking the exposure. Because of the nature of the 110 and 126 film cartridges, the metering systems utilized therewith permit only a single frame-by-frame advance. Moreover, film motion is in a single direction only, with no rewind or prewind capability.

It is a desirable objective to have a film metering system that includes the positive mechanical engagement of a pawl tooth through a film perforation in order to maintain correct positional alignment of a filmstrip frame relative to an exposure gate, yet which is also suitable for use in cameras having a motorized film advance. It is also desirable to provide a mechanical pawl metering system that does not require mechanical interconnections with the shutter release mechanism. Another desirable objective is to have a film metering system that permits the film to be advanced by multiple frames at one time, if desired, and also allows the film to be prewound or rewound by being transported in a direction opposite to the normal frame-to-frame advance between exposures.

A film metering mechanism achieving those objectives is described in commonly-owned, copending U.S. patent application Ser. No. 486,489, entitled "Film Metering Apparatus and Method" and filed on even date herewith, the disclosure of which is incorporated herein by reference. An embodiment of metering mechanism described therein is suitable for use in motor drive film advance cameras using a single perforation per frame film metering fiducial to locate each film exposure frame in alignment with the camera exposure gate. That mechanism allows the film to be stopped in the proper registration position for each exposure, and maintains registration alignment by preventing further unintentional film motion through force balancing, once the film has been positioned. It also allows the film to be transported in either direction without stopping at perforations, if desired, and senses the passage of each perforation in either direction so that a frame count can be established.

SUMMARY OF THE INVENTION

The present invention provides a mechanical pawl film metering apparatus and method, suitable for metering the frame-to-frame advance in a camera having a motorized film drive of a filmstrip perforated at predetermined intervals along its length, which interacts with the film drive to slow the drive speed prior to reaching a motor stop film frame registration position.

In one aspect of the invention, a film metering mechanism has a mechanical pawl including a tooth, elongated slot and sloping ramp cutout that cooperate with fixed pins on a camera housing, similar to the mechanism described in copending U.S. patent application Ser. No. 486,489; and further includes blade means for signaling attainment of a film advance position prior to registration and in response to which drive motor speed can be reduced.

In a preferred embodiment, described in greater detail below, a metering mechanism includes a blade positioned in parallel with the pawl and which has a surface that cooperates with pins on the pawl, and a pawl position sensor, to provide means to control the film drive to slow down film movement prior to reaching a film frame registration position.

The metering system of the invention is suitable for cameras having a motorized film drive. It requires no mechanical connection with other camera mechanisms and interacts with the film drive by means of an electrical switching device. It permits the film to be advanced by more than one frame at a time, if desired, and it allows the film to be transported in the reverse direction for prewind and/or rewind, as appropriate.

As the film approaches its frame registration position, a preliminary signal is provided which permits the speed of the film advance motor to be reduced. Then, at the metered position, the motor can be brought to a complete stop more quickly so that the final film position will be achieved with greater accuracy. A closely controlled positive stop limits any back up motion of the pawl and film after metering.

BRIEF DESCRIPTION OF THE DRAWINGS

An embodiment of the invention has been chosen for purposes of description and illustration, and is shown in the accompanying drawings, wherein.

Throughout the drawings, like elements are referred to by like numerals.

DETAILED DESCRIPTION OF PREFERRED EMBODIMENT

Figure 1:
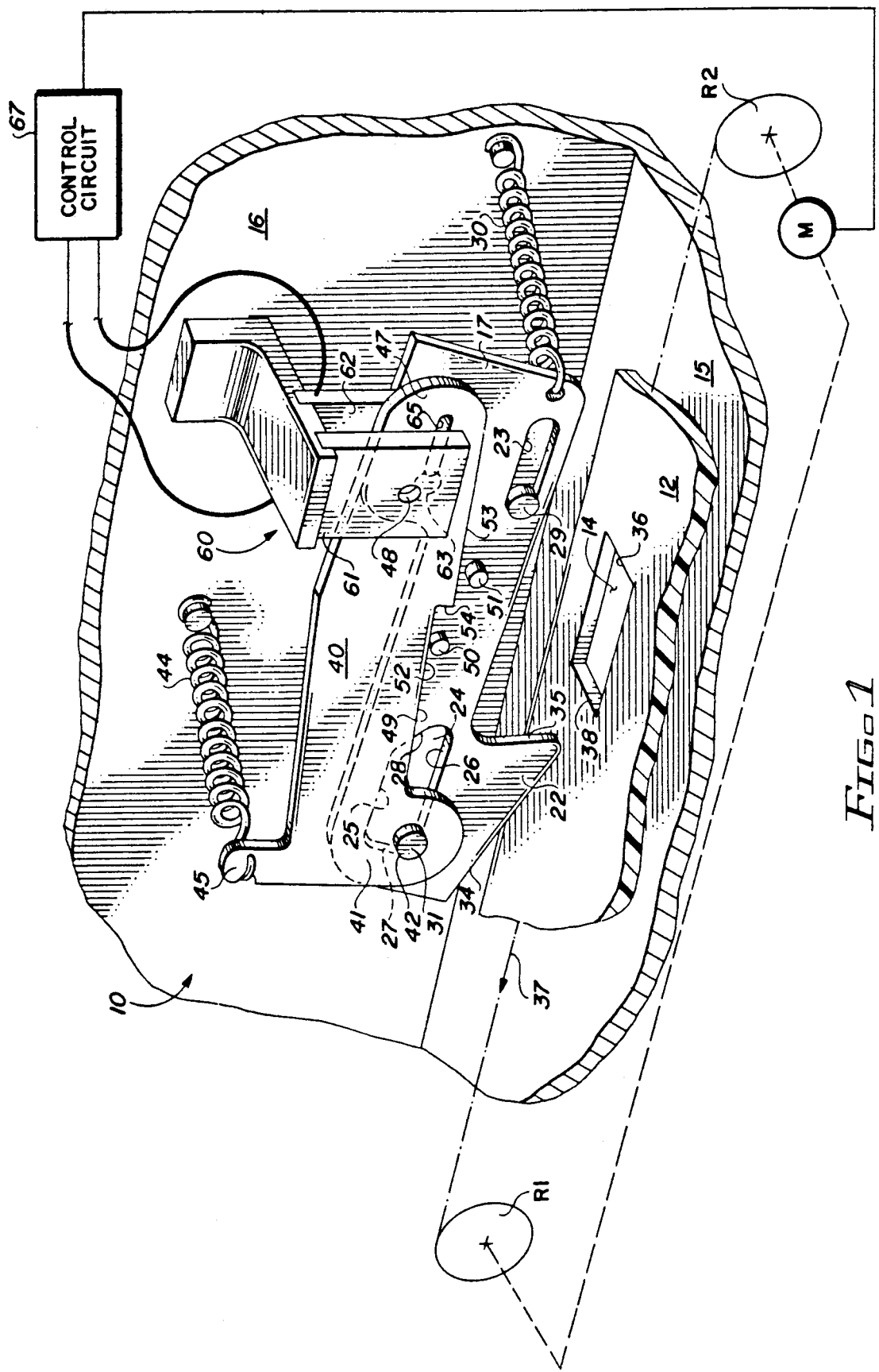
FIG. 1 is a fragmentary view of a film metering mechanism in accordance with an embodiment of the invention.

FIG. 1 shows an exemplary implementation of a film metering mechanism 10 suitable for use in metering the frame-to-frame advance of a strip of film 12 having marginal perforations 14 located at predefined intervals therealong. The film 12 is caused to travel along an exposure plane 15 within a camera body 16 by means of a motorized drive M operable for advancing the film 12 between reels R1, R2.

The mechanism 10 comprises a planar, elongated pawl 17 having features and operations similar to those of the pawl of the related film metering mechanism embodiment described in copending, commonly-owned U.S. patent application Ser. No. 486,489. The pawl 17 has a downwardly-projecting perforation-sensing tooth 22 and is mounted for rotational and longitudinal movement relative to the housing 16. It includes a generally longitudinally-aligned elongated slot 23 and a four-sided cutout 24 formed at a position longitudinally-spaced therefrom. The cutout 24 includes upper and lower, generally longitudinally-extending edges 25, 26, the upper edge being shorter than the lower edge; a generally laterally-extending forward edge 27; and a rear edge 28 in the form of a ramp or cam surface. A pin 29 fixed to the camera body 16 extends through the slot 23 and means, such as a spring 30 extending between a rearward point on the pawl 17 and the camera body 16, biases the pawl 17 to locate the pin 29 at a front end of the slot 23.

A second pin 31, also fixed to the body 16, extends through the cutout 24. The front edge surface 27 of the cutout 24 is relatively located so that the biasing means 30 also biases the pin 31 into abutment with the forward edge 27. Moreover, the same spring 30, can be connected as shown, or a separate spring can be employed as shown in the referenced copending application, to bias the pawl 17 in a counterclockwise direction of rotation about the axis of pin 29, urging the tooth 22 downwardly toward the exposure plane 15 and onto the film 12.

The tooth 22 of the pawl 17 has a leading edge 34 sloped downwardly and rearwardly, and a trailing edge 35 sloped downwardly and rearwardly at a much steeper slope. The trailing edge 35 is configured to catch and hold the trailing edge 36 of the perforation 14, when the film 12 is driven in the frame-to-frame advance direction (indicated by arrow 37) between exposures. The slope of the leading edge 34 is configured to act with the leading edge 38 of the perforation 14 to permit the pawl 17 to ride up and out of the perforation 14 against the counterclockwise bias of spring 30, when the film 12 is driven in a reverse direction (direction opposite to arrow 37).

The general configuration of pawl 17, and the relationships of the tooth 22, slot 23, and cutout 24 relative to the film perforations 14 and the pins 29, 31, are generally the same as those of corresponding elements of the pawl described in the copending application, which gives further details and describes the operation of such a pawl member.

In accordance with the present invention, a blade 40 is implemented in cooperation with the pawl 17 to provide means for signalling the approach of the film 12 near to its metered registration position, in order to permit the speed of the film advance motor M to be reduced prior to reaching a stopping point.

The blade 40 is a planar member, disposed generally parallel to the pawl 17. It includes at its forward end a downwardly extending body portion 41 having a circular aperture 42 concentrically engaged about the pin 31 for rotation of the blade 40 about the axis of pin 31. Biasing means in the form of a spring 44 is connected between an upward extension 45 of the blade 40 and the body 16, to bias the blade 40 in a clockwise rotational direction about the pin 31.

The blade 40 also includes a rearwardly extending elongated arm portion 47 having a circular aperture 48 and a stepped lower edge surface 49 configured to variously cooperatively engage with lift pins 50, 51 located proximate thereto on a facing surface of the pawl 17, in a manner described further below. The surface 49 includes a raised forward section 52 and a lowered rear section 53, with the two sections 52, 53 being separated by a step or discontinuity 54. The relationships between the various elements are established generally so that the forward section 52 will be in contact with the pawl pin 50, except when the upper edge surface 25 of the cutout 24 is in contact with the pin 31. In the latter case, blade lifting contact between the section 52 and the pawl pin 50 will be broken, and lifting contact will be established between the section 53 and the pawl pin 51.

The position of the pawl 17 relative to the perforation 14 and camera body 16 is detectable by means of a sensor 60 located on the housing 16, in order to detect shifts in the relative positions of pawl 17 and blade 40. The shown embodiment includes paired infrared emitter and detector elements 61, 62, aligned to monitor the passage of portions of the pawl 17 and blade 40 through an infrared beam 63. The pawl 17 includes a longitudinal aperture 65 of length generally equal to the length of the upper edge surface 25 of the cutout 24 traversed by pin 31 during travel of the pawl tooth 22 between an initial perforation engaging position and a drive motor stop position. The rear portion of the blade arm 47 has an aperture 48 positioned so that it will coincide with the elongated pawl aperture 65 when section 53 of the blade edge 49 is in contact with the pin 51.

The operation of the mechanism 10 is described with reference to FIGS. 2A-2D.

Figure 2A:
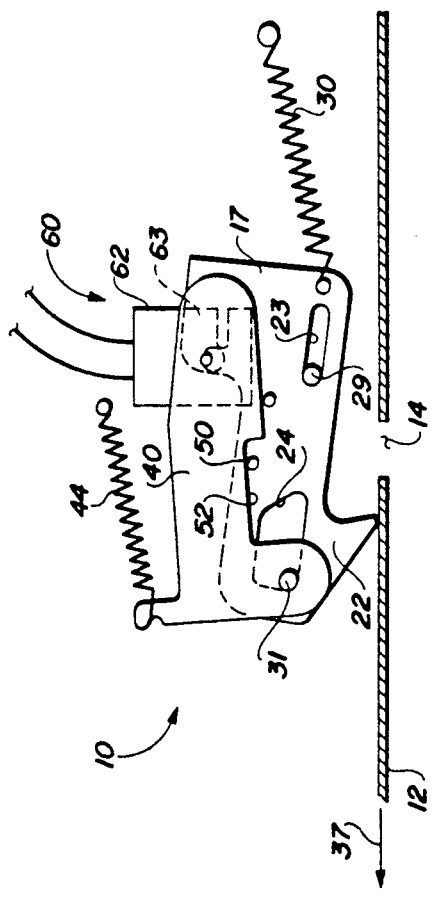
FIGS. 2A-2D are schematic views showing steps in the operation of the apparatus of FIG. 1.

FIG. 2A shows the metering mechanism 10 in its FIG. 1 position, as the film 12 is being advanced by motor M in a direction 37 to bring the next available unexposed frame into registration with the exposure gate. The pawl 17 is supported and guided by the two pins 29, 31 fixed in the camera housing 16. Pin 29 engages the slot 23 in the pawl 17, and pin 31 engages the cutout 24. The pawl 17 is urged to the rear by spring 30, so that the front end of the slot 23 bears against pin 29 and the forward edge 27 of the cutout 24 bears against pin 31. The same spring 30 also urges the pawl tooth 22 to press lightly down against the film 12. The blade 40 is urged by spring 44 to pivot about pin 31 in the clockwise direction, so that the forward section 52 of its lower edge surface 49 (FIG. 1) rests against lift pin 50 which is fixed to the pawl 17. With the pawl 17 and blade 40 positioned as shown in FIG. 2A, transmission of the infrared beam 63 of the sensor 60 from the emitter 61 (FIG. 1) to the detector 62 is blocked.

Figure 2B:
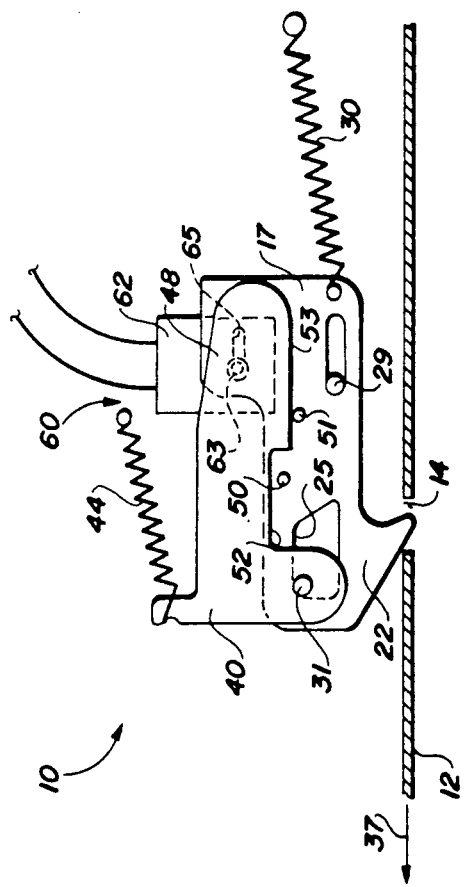

As the motor M continues to advance the film 12 in the direction 37, a perforation 14 will arrive at the pawl tooth 22 and the tooth point will enter the perforation 14, as shown in FIG. 2B. As the tooth 22 enters, the pawl 17 rotates about pin 29 until the upper edge surface 25 of the pawl cutout 24 rests on pin 31. This motion of pawl 17 also shifts the positions of pawl pins 50, 51, thereby causing the blade 40 to rotate about the pivot point of pin 31 under urging of the spring 44. The combined rotations of the pawl 17 and the blade 40 cause the support of the blade 40 to be transferred from contact of the section 52 of the lower edge surface 49 with the lift pin 50, to contact of the section 53 with lift pin 51. The same motions also cause the circular aperture 48 in the rear of the blade 40 and the elongated aperture 65 in the upper part of the rear of the pawl 17 to line up between the emitter 61 and detector 62 so that the path of the beam 63 is no longer blocked. This action generates an electrical signal which is passed from the sensor 60 to motor control circuitry 67 (FIG. 1), which causes the speed of the film advance motor M to be reduced.

Figure 2C:
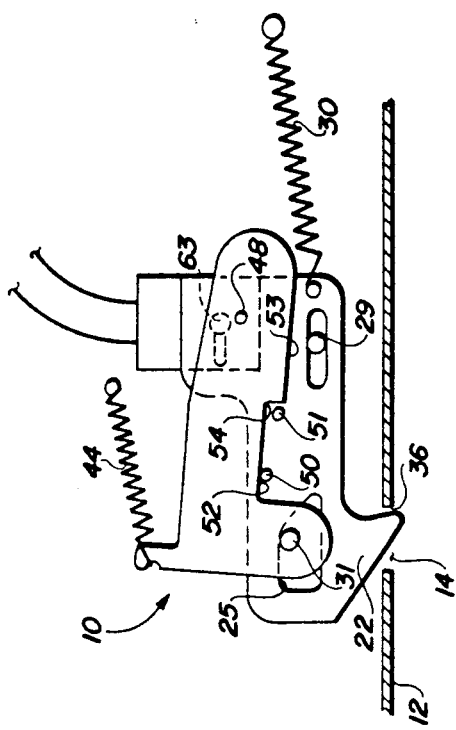
Figure 2D:
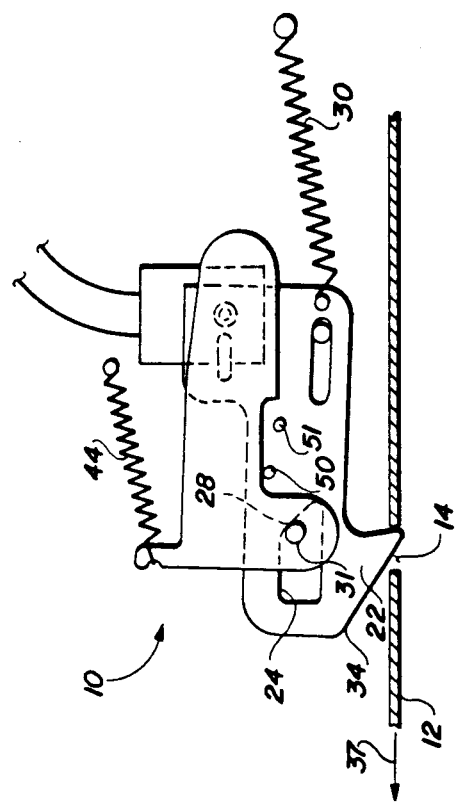

As the motor M decelerates to the reduced speed, the film 12 continues to advance, and the trailing edge 36 of the perforation 14 contacts the pawl tooth 22 and pulls the pawl 17 along in the direction of advance 37 of the film 12. Blade lift pin 51 follows this motion by moving forwardly on the section 53 of the blade lower surface 49, until the step 54 (FIG. 1) between the sections 52 and 53 is reached. When this happens, the blade 40 will rotate clockwise under action of spring 44 until the section 52 is again supported by the lift pin 50, as shown in FIG. 2C. The rotation of the blade 40 moves the blade aperture 48 so that the emitter to detector path of the beam 63 is again interrupted. This signals the control circuit 67 (FIG. 1) to bring the motor M to a stop, and the film 14 advance is completed. The length of upper edge surface 25 may be slightly longer than the pin 31 travel distance between FIGS. 2B and 2C, to accommodate coasting. However, since the motor speed has already been reduced when braking is applied, the motor M may be brought to a stop very quickly, so coasting is minimal, if any. The time between the signals for slowing and stopping the motor M can be set by adjusting the amount of pawl 17 travel required for lift pin 51 to reach the step 54 in the blade lower edge surface 49.

The film 12 comes to a stop with the pawl tooth 22 pulling on the film 12 in the retarding direction (opposite to arrow 37). This prevents any additional creepage of the film in the film 14 advance direction 37. Also, the pawl 17 comes to rest with lift pin 51 at the step 54 in the lower edge surface 49 of the blade 40. Thus, if the force of spring 30 on the pawl 17 causes the film 12 to move in the reverse direction, such motion will be limited to only that very small travel distance until pin 51 contacts the blade step 54 and prevents further motion. In this manner, the registration position of the film frame is accurately maintained until exposure of the registered frame occurs.

In order to advance the film 12 to the next subsequent unexposed frame, the drive motor M is restarted, causing the film to advance further in the direction 37 and pull the pawl 17 forward with it. As the pawl 17 moves forward, the ramp surface 28 will contact the pin 31 at the upper rear of the cutout 24 (FIG. 2D), thereby causing the pawl tooth 22 to lift out of the perforation 14. At the same time, the blade lift pin 50 moves upwardly and forwardly along the surface 52, thereby rotating the blade 40 so that the step in the lower edge surface 49 of the blade 40 no longer blocks the travel path of lift pin 51. When the pawl tooth 22 becomes disengaged from the perforation 14, the pawl spring 30 pulls the pawl 17 back to its original position (shown in FIGS. 1 and 2A), ready to detect the next advancing perforation.

The film 12 may be rapidly advanced through each perforation 14 in either direction merely by controlling the motor M so that it continues to run when the perforations 14 are sensed. When film 12 is moved in the reverse direction for prewind or rewind, the pawl tooth 22 will enter each perforation 14. As the film 12 motion continues, the pawl tooth 22 will be pushed back out of the perforation 14 by action of the low incline slope of the forward edge surface 34 of the tooth 22 against the forward edge 38 of the perforation 14.

Those skilled in the art to which the invention relates will understand that the foregoing detailed description is intended to be merely exemplary and not exclusive, and that various substitutions and modifications may be made to the described embodiment without departing from the spirit and scope of the invention as defined by the claims below.

What is claimed is:

1. In a camera having a housing, means defining an exposure plane within said housing, and means for advancing a strip of film in a frame-to-frame advance direction along said exposure plane, said film having a plurality of perforations located at predetermined frame metering intervals along said film, frame metering apparatus comprising:

first and second guide pins fixedly located on said housing;

an elongated pawl including a film perforation sensing tooth and first and second lift pins; said pawl being formed with an elongated slot and integral adjacent longitudinal and ramp surfaces; and said pawl being mounted for rotational and longitudinal movement relative to said housing, with said first guide pin engaging said slot and said second guide pin proximate said straight and ramp surfaces;

means biasing said pawl in a longitudinal direction, with said ramp surface being urged away from said second guide pin;

means biasing said pawl in a rotational direction about said first guide pin, with said tooth being urged toward said exposure plane and said longitudinal surface being urged toward said second guide pin;

an elongated blade disposed generally parallel to said pawl in engagement for rotation about said second guide pin; said blade being formed with a stepped surface having a first section proximate said first lift pin and having a second section proximate said second lift pin;

means biasing said blade in a rotational direction about said second guide pin, with said stepped surface being urged into contract with said first and second lift pins; and means for detecting when said second section is in contact with said second lift pin;

said pawl, blade and biasing means being relatively dimensioned, configured and adapted so that said tooth is urged to engage in a perforation, with said longitudinal surface in contact with said second guide pin and said second section in contact with said second lift pin, when said film is moved in said advancement direction toward a position approaching registration of a next available exposure frame; so that said second section contact with said second lift pin is terminated and said first section is brought into contact with said first lift pin when said film reaches said position of registration; and so that said ramp surface is brought into engagement with said second guide pin against the bias of said longitudinal direction biasing means to disengage said tooth from said perforation in response to movement of said tooth with said film, when said film is moved beyond said registration position further in said advancement direction.

2. Film frame metering apparatus as in claim 1 wherein said means for detecting further comprises means for generating a signal when said second section contact with said second lift pin is detected; and wherein said apparatus further comprises means for controlling said film advancing means in response to said signal.

3. Film frame metering apparatus as in claim 1, wherein said means for advancing comprises a drive motor, and said means for controlling comprises means for slowing said drive motor in response to said signal.

4. Film frame metering apparatus as in claim 3, wherein said signal is a first signal, wherein said means for detecting further comprises means for generating a second signal when said detection of second section contact with said second lift pin is terminated, and said means for controlling further comprises means for stopping said drive motor in response to said second signal.

5. Film frame metering apparatus as in claim 1, wherein said pawl includes a first aperture; said blade includes a second aperture dimensioned, configured and adapted to be in alignment with said first aperture when said second section is in contact with said second lift pin, and to be in nonalignment with said second aperture when said first section is not in contact with said second lift pin; and said means for detecting comprises means for detecting said alignment of said apertures.

6. Film frame metering apparatus as in claim 1, wherein said pawl is further formed with a cutout having edges constituting said longitudinal and ramp surfaces; and said pawl is mounted relative to said housing with said second guide pin engaging said cutout.

7. Film frame metering apparatus as in claim 6, wherein said edges are upper and rear edges respectively, said cutout further has forward and lower edges, and said means biasing said pawl in said longitudinal direction comprises means biasing said forward edge into contact with said second guide pin.

8. In a camera having a housing, means defining an exposure plane within said housing, and means including a drive motor for advancing a strip of film in a frame-to-frame advance direction along said exposure film, said film having a plurality of perforations located at predetermined frame metering intervals along said film, frame metering apparatus comprising:

a pawl, including a film perforation sensing tooth;
a blade;
means biasing said pawl with said tooth urged toward said exposure plane;

mechanical means mounting said pawl for movement in said housing so that said tooth is located to engage with a perforation under urging of said biasing means when said film is moved in said direction to advance a next available exposure frame to a first tooth engagement position, and so that said pawl tooth is caused to travel with said film by engagement of said tooth with said perforation as said film is further moved in said direction from said first position through a second intermediate position, to a third registration position;

means mounting said blade for movement in said housing, including mechanical means coupling said pawl and said blade so that said blade is moved relative to said pawl when said tooth is moved with said film from said first to said second position;

means for detecting said relative blade and pawl movement and for generating an electrical signal in response to said detection; and means for controlling said drive motor to slow the advance of said film in response to said signal when said film reaches said second position.

9. Film frame metering apparatus as in claim 8, wherein said signal is a first signal, wherein said means coupling said pawl and said blade further acts so that said blade is further moved relative to said pawl when said tooth is moved with said film from said second to said third position; wherein said means for detecting and generating further comprises means for detecting said further relative movement and for generating a second electrical signal in response to said further detection; and wherein said means for controlling further comprises means for controlling said device motor to stop the advance of said film in response to said second signal when said film reaches said third position.

10. Film frame metering apparatus as in claim 9, wherein said pawl is formed with a lift pin, said blade is formed with a stepped surface, said apparatus further comprises means biasing said pin into contact with said stepped surface, and wherein said means coupling said pawl and said blade includes means for moving said lift pin relative to said stepped surface when said tooth is moved with said film from said first to said second position.

11. Film frame metering apparatus as in claim 10, wherein said lift pin is a first lift pin, said pawl includes a second lift pin spaced from said first lift pin, said stepped surface includes a first section and a second section; and wherein said means mounting said blade comprises means mounting said blade so that said first pin is normally in contact with said first section and said blade shifts relative to said pawl to bring said second pin into contact with said second section when said tooth moved with said film reaches said second position.

12. Film frame metering apparatus as in claim 11, wherein said means mounting said blade further comprises means mounting said block so that said blade shifts relative to said pawl to bring said first pin back into contact with said first section when said tooth is moved with said film from said second to said third position.

13. Film frame metering apparatus as in claim 11, wherein said pawl includes a first aperture; said blade includes a second aperture dimensioned, configured and adapted to be in alignment with said first aperture when said second section is in contact with said second pin, and to be in nonalignment with said first aperture when said second section is not in contact with said second pin; and said means for detecting comprises electrooptical means for detecting said alignment of said apertures.

14. A method for metering the exposure frames of a strip of film in a camera having a housing, means defining an exposure plane within said housing, and means, including a drive motor, for advancing said film in a direction along said exposure plane, said film having a plurality of perforations located at predetermined frame metering intervals along said film, said method comprising the steps of:

providing a pawl movably mounted on said housing, and a blade movably mounted on said housing, said pawl including a perforation sensing tooth and being mechanically coupled with said blade;

biasing said pawl with said tooth being urged toward said exposure plane and against said film;

moving said film in said advancement direction to a first position using said motor, so that said tooth automatically engages in a perforation due to said pawl biasing;

moving said film further in said advancement direction to a second position using said motor, so that said tooth travels with said perforation and film to automatically move said blade relative to said pawl when said film is moved to said second position;

detecting said relative movement of said blade and pawl and generating an electrical signal in response thereto; and controlling said motor in response to said signal to slow the advance of said film when said film reaches said second position.

15. A method as in claim 14, wherein said signal comprises a first signal, and further comprising the steps of:

moving said film yet further in said advancement direction to a third registration position using said motor, so that said tooth travels with said perforation and film to automatically move said blade further relative to said pawl when said film is moved to said third position;

detecting said further relative movement of said blade and pawl and generating a second electrical signal in response thereto; and controlling said motor in response to said second signal to stop the advance of said film when said film reaches said third position.

16. A method as in claim 15, wherein said detecting and signal generating steps are carried out using electrooptical means.

17. A method as in claim 16, wherein said pawl has a first aperture, said blade has a second aperture, and one of said steps comprises detecting alignment of said apertures using an optical beam.

18. A method as in claim 17, wherein said step of detecting said relative movement comprises detecting alignment of said apertures; and said step of detecting further relative movement comprises detecting loss of alignment of said apertures.

* * * * *